United States Patent
Turko et al.

(10) Patent No.: US 9,271,440 B2
(45) Date of Patent: Mar. 1, 2016

(54) PARALLEL LINKAGE OPENER WITH ADJUSTABLE SPRING LOADED PACKER WHEEL

(75) Inventors: Leo V. Turko, Vegreville (CA); Larry T. Beever, Vegreville (CA); Gary Allen Bergen, Vegreville (CA)

(73) Assignee: Buhler Ezee-On Inc., Vegreville, AB (CA)

( * ) Notice: Subject to any disclaimer, the term of this patent is extended or adjusted under 35 U.S.C. 154(b) by 292 days.

(21) Appl. No.: 13/291,843

(22) Filed: Nov. 8, 2011

(65) Prior Publication Data

US 2013/0112123 A1 May 9, 2013

(51) Int. Cl.
*A01B 63/22* (2006.01)
*A01C 7/20* (2006.01)
*A01B 49/02* (2006.01)
(Continued)

(52) U.S. Cl.
CPC .............. *A01C 7/205* (2013.01); *A01B 33/025* (2013.01); *A01B 35/12* (2013.01); *A01B 35/16* (2013.01); *A01B 35/18* (2013.01); *A01B 49/027* (2013.01); *A01B 49/06* (2013.01); *A01B 61/046* (2013.01); *A01C 5/062* (2013.01); *A01C 5/068* (2013.01)

(58) Field of Classification Search
CPC ........ A01C 5/062; A01C 5/068; A01C 5/066; A01C 5/06; A01C 5/00; A01C 7/205; A01C 7/203; A01C 7/201; A01C 7/20; A01C 7/00; A01C 7/208; A01B 15/14; A01B 15/145; A01B 15/02; A01B 15/00; A01B 23/043; A01B 23/04; A01B 25/00; A01B 33/16; A01B 35/12; A01B 35/14; A01B 35/10; A01B 35/08; A01B 35/06; A01B 35/04; A01B 35/02; A01B 35/00; A01B 35/18; A01B 35/16; A01B 33/00; A01B 33/02; A01B 33/025; A01B 49/02; A01B 49/027; A01B 49/04; A01B 51/04; A01B 59/002; A01B 59/00; A01B 59/04; A01B 61/00; A01B 61/04; A01B 61/044; A01B 61/046; A01B 63/00; A01B 63/002; A01B 63/008; A01B 63/14; A01B 63/24; A01B 63/32; A01B 79/02; A01B 79/005; A01B 79/00
USPC ............ 111/926, 62, 134, 135, 927, 136, 69, 111/79, 81, 194, 195, 191, 190, 170, 149, 111/152, 153, 156; 172/407, 395, 239, 413, 172/4, 260.5, 417, 448, 423, 424, 427, 663, 172/675; 701/50
See application file for complete search history.

(56) References Cited

U.S. PATENT DOCUMENTS

5,234,060 A 8/1993 Carter
5,499,829 A * 3/1996 Rohm .............................. 279/62

*Primary Examiner* — Christopher J Novosad
(74) *Attorney, Agent, or Firm* — Adrian D. Battison; Ade & Company Inc.

(57) ABSTRACT

An seeder includes a frame on ground wheels defining tool bars for seeding elements spaced across the frame. Each element includes a pair of parallel arms connected to the tool bar bracket forming a parallel linkage for up and down movement of a support arm connected at a rear end and carrying the packer wheel. A spring applies a downward spring force on the parallel linkage to apply a downward force on the packer wheel so that the spring force increases as the parallel arms pivot upwardly and decreases as the parallel arms pivot downwardly. A control device is arranged to raise and lower the tool bar in response to a detected value of a sensor so as to change the angle of the parallel linkage and change the spring force. A cam controlled double rack adjustment of the height of the opener allows the user to change seeding depth.

21 Claims, 4 Drawing Sheets

(51) Int. Cl.
*A01B 35/12* (2006.01)
*A01C 5/06* (2006.01)
*A01B 35/18* (2006.01)
*A01B 61/04* (2006.01)
*A01B 35/16* (2006.01)
*A01B 33/02* (2006.01)
*A01B 49/06* (2006.01)

PARALLEL LINKAGE OPENER WITH ADJUSTABLE SPRING LOADED PACKER WHEEL

This invention relates to an agricultural seeder in which seeds are conveyed from a central hopper to a number of seeding elements carried upon a frame with the seeds being ejected into the ground through a ground opener provided on each of the seeding elements and rolled by a following packer wheel.

BACKGROUND OF THE INVENTION

Seeders of this type have generally used either a knife or a cutting sweep which is carried at each of the seeding elements by the frame so as to cut a furrow in the ground into which the seeds are deposited. The depth of seeding is of fundamental importance to the germination and should therefore be very accurately controlled. The seed must be properly placed a required spacing from the soil surface and also taking into account soil surface moisture characteristics and the subsurface moisture to obtain the optimum germination.

In many seeders the depth of seeding is controlled by mounting the seeding element in fixed position on the frame and then by controlling the height of the frame relative to the ground as accurately as possible by providing a frame which can flex at different positions so the height of the frame varies to follow as accurately as possible the contours of the ground. However this approach has of course its limitations in that the frame necessarily must have some structural stability which thus limits its ability to totally follow the contours of the ground. Thus some of the seeding elements will at various times provide a depth of seeding which is too deep and other times the depth will be too shallow.

Other commercially available seeding systems are provided in which the seeding elements are individually mounted upon the frame so that they can individually follow the contours of the ground.

SUMMARY OF THE INVENTION

It is one object of the invention to provide an improved seeder where the seeding elements include a ground opener and a packer wheel on an element which can float vertically relative to the frame.

According to one aspect of the invention there is provided an agricultural seeder comprising:

a frame having at least one tool bar;

ground wheels for supporting the frame for transportation in a direction of working movement across ground to be seeded;

a plurality of seeding elements each including a bracket mounted on the tool bar of the frame so that the seeding elements are arranged at spaced positions across the width of the frame for applying seeds to the ground as the frame is moved across the ground;

each seeding element including a ground opener for cutting a furrow into the surface of the ground;

each seeding element including a packer wheel behind the ground opener for rolling along the ground at or adjacent to the furrow;

each seeding element being mounted on the tool bar for up and down floating movement relative to the frame independently of the other seeding elements;

each seeding element including a pair of parallel arms connected to the bracket and extending rearwardly therefrom to form a parallel linkage for up and down pivotal movement relative to the tool bar to different angles of the parallel linkage relative to the ground;

each seeding element including a rearwardly extending support arm connected at a rear end of the parallel arms and carrying the packer wheel such that the packer wheel can move upwardly and downwardly relative to the tool bar;

a spring arrangement applying a downward spring force on the parallel linkage to apply a downward force on the packer wheel, the spring arrangement being arranged such that the spring force increases as the parallel arms pivot upwardly and decreases as the parallel arms pivot downwardly;

and a control device arranged to raise and lower the tool bar relative to the ground so as to change the angle of the parallel linkage relative to the ground so as to change the spring force.

As is well known, one of the function of the packer wheel is to act as a gauge wheel, that is it is the main component for controlling the furrow opener's operating depth.

The control device to raise and lower the frame to control the packer pressure can be operated using a number of different sensor arrangements. Thus a number of different arrangements are possible to adjust/control the force applied on the packer wheel by the frame, that is transferring load from the frame's wheels onto the opener assemblies. Some of these are:

a) sensing the actual force applied on the packer wheels, which can b sensed at one of the packer wheels or at a plurality of packer wheels and averaged, that is a direct approach;

b) sensing the angle of the parallel linkage or the position of the seeding element relative to the tool bar, that is an indirect sensing of the actual force applied on the packer wheel via geometric calculation to determine the force;

c) sensing the position of the frame relative to the packer wheel. It is possible to mount a position sensor on the rocker shaft assembly which controls the height of the frame relative to the ground wheels to implement this arrangement.

d) sensing the hydraulic pressure on the frame height control cylinder.

In all cases, the operator will be able to "dial-in" the desired down force to be applied by the frame to the packer wheel assembly; the objective is to have the system maintain the down force constant in the field, eliminating variations in packing force when travelling from hard soil conditions to soft soils. Of course the total down force is shared between the individual seeding elements and their packer wheels, but typically this force is shared equally, except for individual changes in ground height which are averaged out amongst all of the packer wheels.

Preferably the frame is carried on front and rear castor wheels and the height of the tool bar is controlled by operating a cylinder on the frame to rotate a rocker shaft on the frame to drive through linkages the height of the front and rear castor wheels relative to the frame so that the frame is maintained horizontal as it is raised and lowered. However other frame support arrangements can be used provide the height of the frame is adjustable by moving the position or orientation of the wheels relative to the frame. Preferably the system is operate symmetrically so that the whole of the frame, typically carrying three or more parallel tool bars is lifted while being maintained horizontal. Arrangements of this type can be designed by a person skilled in this art.

Preferably the ground opener is carried on an arm which is independently pivotal relative to the support arm carrying the packer wheel for a spring trip action of the ground opener to accommodate impacts with obstacles. The trip action generally does not include the packer wheel which can float over the objects by the parallel linkage moving upwardly against the spring force. The arm is preferably pivotal relative to the rear pivot pin of a bottom one of the parallel arms.

Preferably the bracket carries a bottom stop member for engaging one of the parallel arms to halt downward movement thereof.

Preferably the parallel arms carry a link of the parallel linkage system connected across rear pivot pins at the rear of the arms which link is rigidly attached to the rearwardly extending support arm carrying the packer wheel.

Preferably the link carries a support member for a rear end of a spring which is deformed by the spring trip and wherein the arm of the ground opener includes at its forward end a lever which pulls a forward end of the spring in the spring trip action.

Preferably the support member for the rear end of the spring forms a part of a brace for the support arm of the packer wheel.

In accordance with another feature, the packer wheel includes a scraper strap extending rearwardly and over the wheel so that a rear end of the strap engages a peripheral surface of the packer wheel.

In accordance with another feature, the ground opener includes a shank carried in a sleeve and extending downwardly from the sleeve for supporting a cutter at a bottom end of the shank and wherein the shank is adjustable longitudinally of the sleeve. Preferably the adjustment is provided by the shank and the sleeve each including a saw tooth rack longitudinally thereof so that the racks are interengaged at longitudinally adjustable positions therealong. There is then provided a manually operable cam which is movable to a locked position in which the racks are forced into engagement and to a released position in which the racks are free for longitudinal adjustment. Preferably the cam is operable by a spring handle which is latched into position in the locked position.

According to a second aspect of the invention there is provided an agricultural seeder comprising:

a frame having at least one tool bar;

ground wheels for supporting the frame for transportation in a direction of working movement across ground to be seeded;

a plurality of seeding elements each including a bracket mounted on the tool bar of the frame so that the seeding elements are arranged at spaced positions across the width of the frame for applying seeds to the ground as the frame is moved across the ground;

each seeding element including a ground opener for cutting a furrow into the surface of the ground;

each seeding element including a packer wheel behind the ground opener for rolling along the ground at or adjacent to the furrow;

each seeding element being mounted on the tool bar for up and down floating movement relative to the frame independently of the other seeding elements;

wherein the ground opener includes a shank carried in a sleeve and extending downwardly from the sleeve for supporting a cutter at a bottom end of the shank where the shank is adjustable longitudinally of the sleeve; and wherein the shank and the sleeve each include a saw tooth rack longitudinally thereof so that the racks are interengaged at longitudinally adjustable positions therealong and wherein there is provided a manually operable cam which is movable to a locked position in which the racks are forced into engagement and to a released position in which the racks are free for longitudinal adjustment.

The arrangement described herein can provide one or more of the following features and advantages:

1. Seeding depth is maintained independently from adjusting the position of the drill frame, when in general operating position for engaging tool in the soil, as a result of the independent motion of the parallel linkage;

2. The parallel linkage allows to maintain the vertical relationship between the hoe opener point and the packer wheel elevation 3. The spring loaded linkage is designed to apply a known down force on the packer wheel via an adjustment of the drill frame elevation from the ground surface so that the control system can be operated to "dial-in" a set packer down force;

4. The design allows for a desirable range of packing down force from less than 70 lbs to over 250 lbs;

5. The operation depth or seeding depth for the opener is adjusted without any tools, via a double rack assembly held in place by a spring loaded cam system;

6. The actual seeding depth is solely achieved by adjusting the vertical position of the opener relative to the packer wheel's elevation;

7. The packer wheel elevation is not adjusted;

8. The assembly comprises only a single furrow opener;

9. The furrow opener is allowed to trip independently from the overall assembly via its own heavy spring loading, if required as a result of striking a stone or other obstacle with a trip force which can be adjustable;

10. The use of this parallel linkage is not limited to using a hoe opener; other soil engaging tools could be used instead 11. The assembly includes an infinitely adjustable scraper for the packer wheel.

12. It can provide adjustable packing pressure which is delivered through twin springs at the seeding element and regionally by hydraulic pressure set at the cab which controls the pressure supplied to the hydraulic cylinders controlling the height of the frame.

13. The basic setting for each shank is set at the factory which means re-setting is not necessary at the frame and individual hydraulic rams are not necessary and are not used at the seeding elements.

14. The seeding depth is set in small increments using a simple manual setting arrangement. This makes it sufficiently easy for depth adjustment to be made that it overcomes the general reluctance to change for different crops or different soil conditions.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 6:
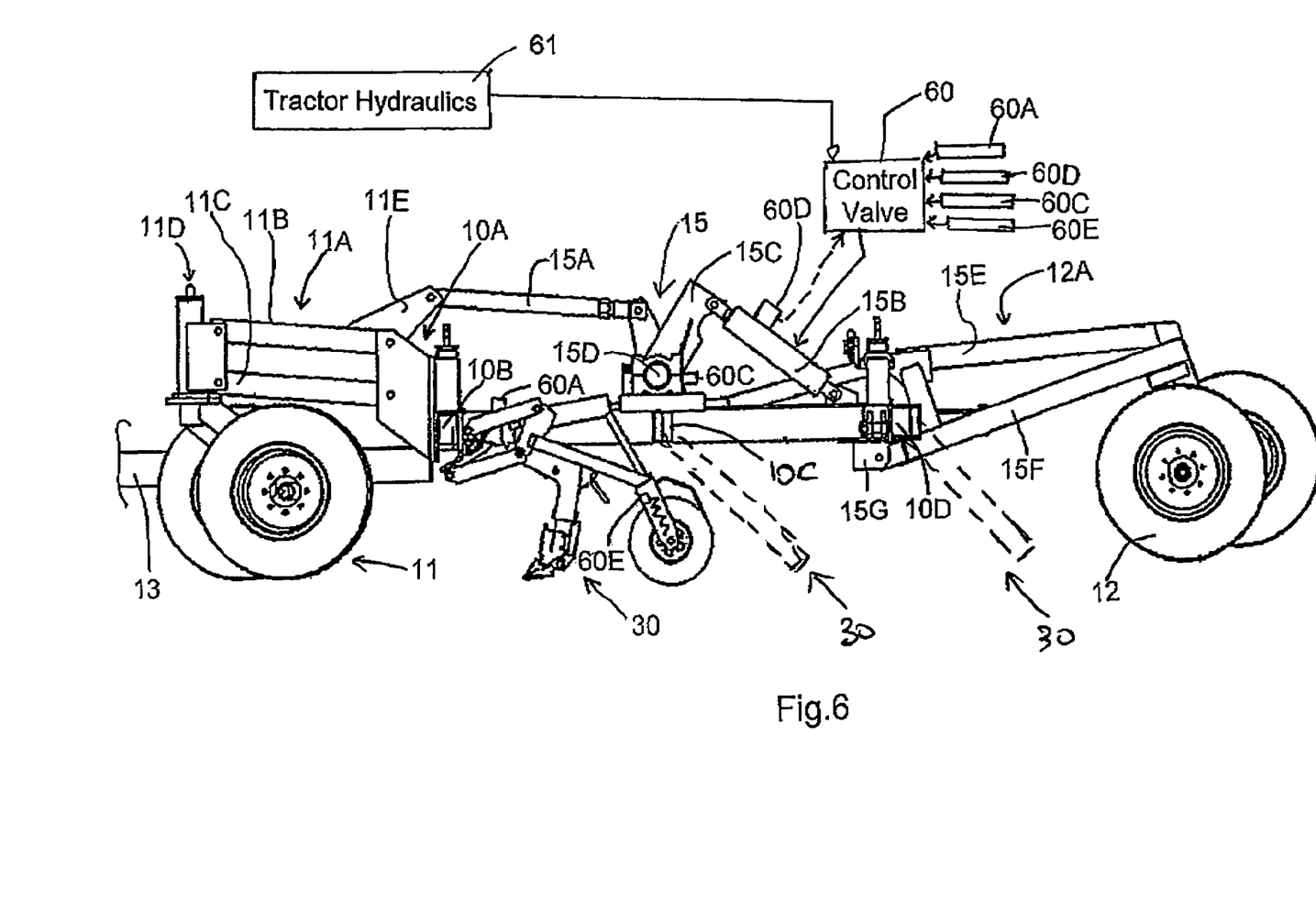
FIG. 6 is a side elevational view of a seeder according to the present invention including the seeding element of FIG. 1.
Figure 7:
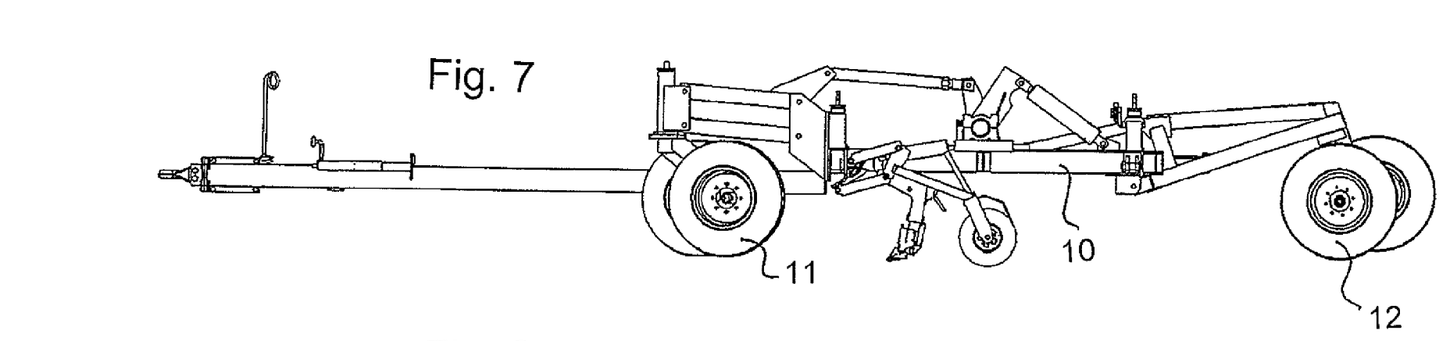
FIGS. 7, 8 and 9 are a side elevational view of the seeder of FIG. 6 including the seeding element of FIG. 1.
Figure 8:
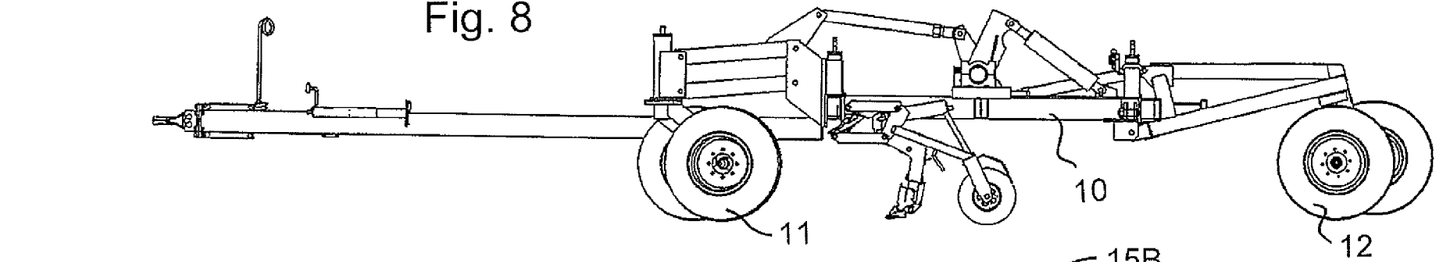
Figure 9:
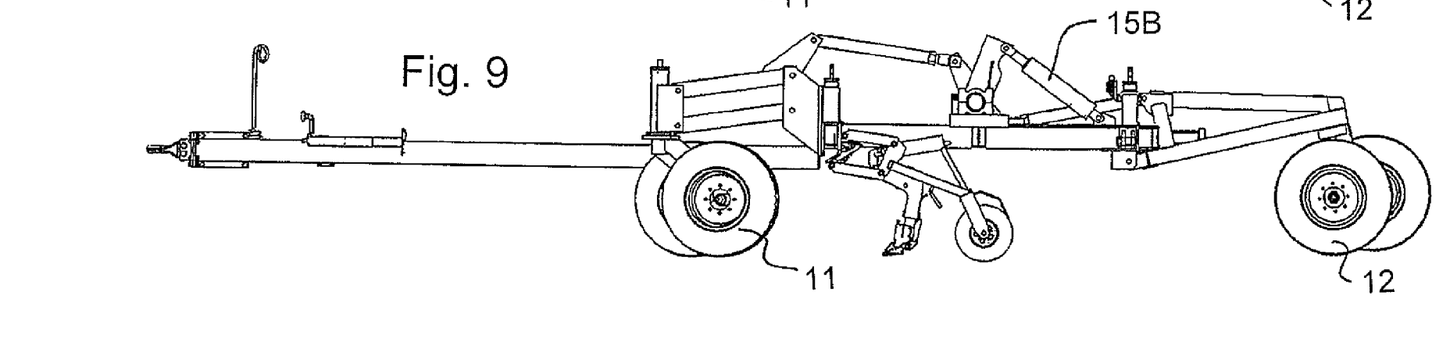

Turning firstly to FIG. 6 the whole of the seeding apparatus is shown in side elevation and comprises a main central frame 10 mounted for movement across ground to be seeded on a front wheel assembly including a pair of ground wheels 11 and a rear pair of spaced ground wheels 12.

Both front and rear wheels form dual castor wheels. The frame includes a series of side by side sections (not shown) which can fold in conventional manner and each is individually supported by ground wheels (not shown) which operate simultaneously with the wheels 11 and 12. The frame is generally rectangular and formed from longitudinal and transverse beams in conventional manner. A forward part of the frame includes a hitch 13 for coupling to a towing vehicle. The front wheels 11 are carried on a support 11A from a forward end of the frame 10. The rear wheels 12 are carried on a support 12A from a rear end of the frame 10.

The details of the frame structure are not described as these will be apparent to one skilled in the art and do not form an important part of this invention.

The ground wheels 11 and 12 are mounted on the supports 11A and 12A so that they can be raised and lowered in height relative to the frame 10. Thus the support 11A includes a pair of parallel links 11B, 11C connected at a rear end to a forward end 10A of the frame and extending forwardly therefrom to a castor support 11D of the castor wheels 11. A lever 11E acts to pivot the parallel links 11B, 11C about the rear pivot so as to raise and lower the wheels 11 relative to the frame 10. The lever 11E is drive in pivotal movement by a link 15A of a drive system 15 operated by a cylinder 15B and a lever 15C connected to a rock shaft 15D on the frame.

The rock shaft 15D also drives a link 15E which pushes down on a lever 15F which carries the rear wheels 12 and is pivotally connected to the frame 10 by a bracket 15G.

In FIG. 6, one of the seeding elements is illustrated and indicated at 30. These seeding elements trail behind a transverse tool bar 31 of the frame 10 and arranged alternately on forward and rearward tool bars 10B, 10C, 10D in conventional manner, as shown schematically, so as to provide a seeding action across the full width of the frame while allowing sufficient space in between the individual seeding elements on each of the transverse tool bars. The remaining seeding elements are omitted from the frame structure in FIG. 6 for convenience of illustration.

The seeds and, if required, fertilizer are carried through ducts (not shown) for the distribution and splitting action by an air stream generated by a fan (not shown) carried on the frame at a suitable location.

The rock shaft acts to simultaneously drive all of the ground wheels to lift or lower in unison so that the frame 10 remains horizontal as it is lifted and lowered relative to the ground. Thus all of the tool bars 10B, 10C, 10D are supported at a common distance from the ground which is changed by operation of the rock shaft 15D.

One of the seeding elements 30 is illustrated in detail in FIGS. 1 through 5. The remaining seeding elements are identical to the one illustrated.

On a rear vertical face of the tool bar 10A is mounted a vertical plate 32 which si clamped to the tool bar 10A by conventional loops 31. The vertical plate includes a bottom portion 32A inclined forwardly and downwardly from the bottom of the vertical plate to a position underneath the tool bar 10A.

The seeding element further includes a parallel linkage 33 defined by upper and lower parallel arms 34 and 35. Each of the arms is formed by a channel member with side walls which provide supports for transverse pivot pins 34A and 35A at the front and 34B and 35B at the rear. The front pin 34A of the upper arm 34 is pivotally mounted on the vertical plate 32 and the front pin 35A of the lower arm 34 is pivotally mounted on the inclined plate portion 32A.

Across the rear pivot pins 34B and 35B is connected a rear link 38 which also is channel shaped and includes side walls 38A and 38B connected to the pivot pins. Thus the link and the parallel arms form a parallel linkage which controls movement of the link 38 so that it moves vertically as the arms 34 and 35 pivot about their respective pins 34A and 35A.

A stop member 37 is connected to the inclined portion 32A and extends upwardly and rearwardly therefrom to form an upper support surface 37A which butts the bottom of the arm 34 in a lower most position thereof allowed by the structure.

A spring arrangement 36 which in this embodiment is defined by two side by side springs is connected at its upper end to a bracket 36B connected to the underside of the arm 34 and at its lower end 36A to a plate 36C adjacent to and fixed to the stop member 37 so that the tension springs 36 act to apply a downward force on the parallel linkage tending to pull the link 38 downwardly. The amount of string force applied is proportional to the amount of extension of the spring so that it is proportional to the angle of the upper arm 34 around the pivot pin 34A. Thus the spring force increases as the parallel arms pivot upwardly and decreases as the parallel arms pivot downwardly. A packer wheel 40 includes a hub 40A carried on a spindle 40B supported by a support 40C including a top plate 40D and either one or two depending legs 40E each on a respective side of a pneumatic tire 40F, A scraper strap 41 includes a top plate 41A attached to the plate 40D and includes a scraper portion 41B extending rearwardly and over the wheel tire 40F so that a rear end 41C of the strap engages a peripheral surface of the packer wheel tire 40F at a position just above the spindle 40b at the rear so that as the tire moves upwardly and rearwardly, any mud collecting on the tire periphery is scraped away and does not reach the base 40D of the support 40C to cause collection.

The base 40D is connected to a pair of parallel support tubes 42A and 42B of a support arm 42 which extend upwardly and forwardly to the side walls 38A and 38B respectively of the link 38 so that the support arm 42 is rigidly connected to the link and moves with it by a welded connection between the tubes and the side walls of the link.

A trip spring support tube 49 extends rearwardly from a front end 49B welded between the sides 38A and 38B of the link 38 to a rear end 42A of the support tube which is braced to the plate 40D by a tubular brace 50. This forms a triangular braced system which holds the packer wheel at a rigid fixed position relative to the link 38 so that the packer wheel can only float upwards and downwards with the parallel linkage 33.

An opener 51 includes a ground opening element 51A connected to a shank 51B. The ground opening element can be of many different types such as points which knock on to or engage on to the shank or other types such as disk openers. A point 51C is shown and as is well known includes seed and/or fertilizer guide tube systems 51D of a conventional construction.

The shank 51B is connected at its upper end to an element 51F formed as a sleeve which connects at its upper end to a forwardly extending portion 51E located between the side walls 38A and 38B of the link 38. The forward end 51E mounts on the pin 35D for pivotal movement of the element 51F and shank 51D relative to the link 38 in a tripping action. The forward end 51E carries a lever 51G extending upwardly from the pin 35B to an upper end which is attached to a forward end of a trip spring 52 located within the tube 49. Upward and rearward tripping action of the opener 51 by pivotal movement about the pin 35B does not change the position of the link 38 or the packer wheel but allows the point to move away from an obstacle while tensioning the spring 52 by pulling forwardly on its front end relative to its rear end which is anchored at the end 49A of the tube 49.

Thus the plurality of seeding elements 30 each include a bracket 32 mounted on the tool bar 10A of the frame so that the seeding elements 30 are arranged at spaced positions across the width of the frame for applying seeds to the ground as the frame is moved across the ground.

Each seeding element including the ground opener 51A for cutting a furrow into the surface of the ground and a packer wheel 40 behind the ground opener 51A for rolling along the ground at or adjacent to the furrow so formed in a packing action.

Each seeding element 30 is mounted on the tool bar for up and down floating movement relative to the frame independently of the other seeding elements.

Each seeding element includes the pair of parallel arms 34, 35 connected to the bracket 32 and extending rearwardly therefrom to form a parallel linkage 33 for up and down pivotal movement relative to the tool bar to different angles of the parallel linkage 33 relative to the ground.

Each seeding element includes a rearwardly extending support arm 42 connected at the link 38 at the rear end of the parallel arms 34, 35 and carrying the packer wheel 40 such that the packer wheel can move upwardly and downwardly relative to the tool bar.

The shank 51B is carried in the sleeve 51F and extends downwardly from the sleeve 51F for supporting the cutter or point 51A at a bottom end of the shank. The shank 51B is adjustable longitudinally of the sleeve 51F by an adjustment arrangement 53 which is of a construction which can be quickly and manually operated. Thus the rectangular sleeve 51F and the rectangular shank 51B slidable therein each include attached thereto a saw tooth rack 53A and 53B respectively extending longitudinally thereof. The racks are interengaged at longitudinally adjustable positions thereal-ong so that the teeth of the racks hold the elements at fixed positions defining a fixed position for the point relative to the pin 35B. A manually operable cam 53C engages the shank 51B on the side opposite the rack 53A so as to press the rack 53A on to the rack 53B. The earn 53C is thus rotatable about a pin 53E so as to be movable to a locked position of a nose 53D as shown in which the racks are forced into engagement. The cam can be released by a spring handle 53G to a released position where the nose is moved away from the shank in which the racks are free for longitudinal adjustment. The spring handle is a wire which can be lifted from a latch 53H in the locked position and rotated to the release position of the nose.

As shown in FIG. 6, a control device in the form of an actuating valve 60 is arranged to raise and lower the tool bar relative to the ground by operating hydraulic pressure to the cylinder 15B from the tractor hydraulics 61. This acts so as to change height of the tool bar relative to the ground and hence the angle A of the parallel linkage relative to the ground so as to change the spring force generated by the spring 36.

In FIG. 6 alternative arrangements are shown.

In one arrangement, the control device 60 is operated in response to a signal from a sensor 60A at the seeding element.

Figure 1:
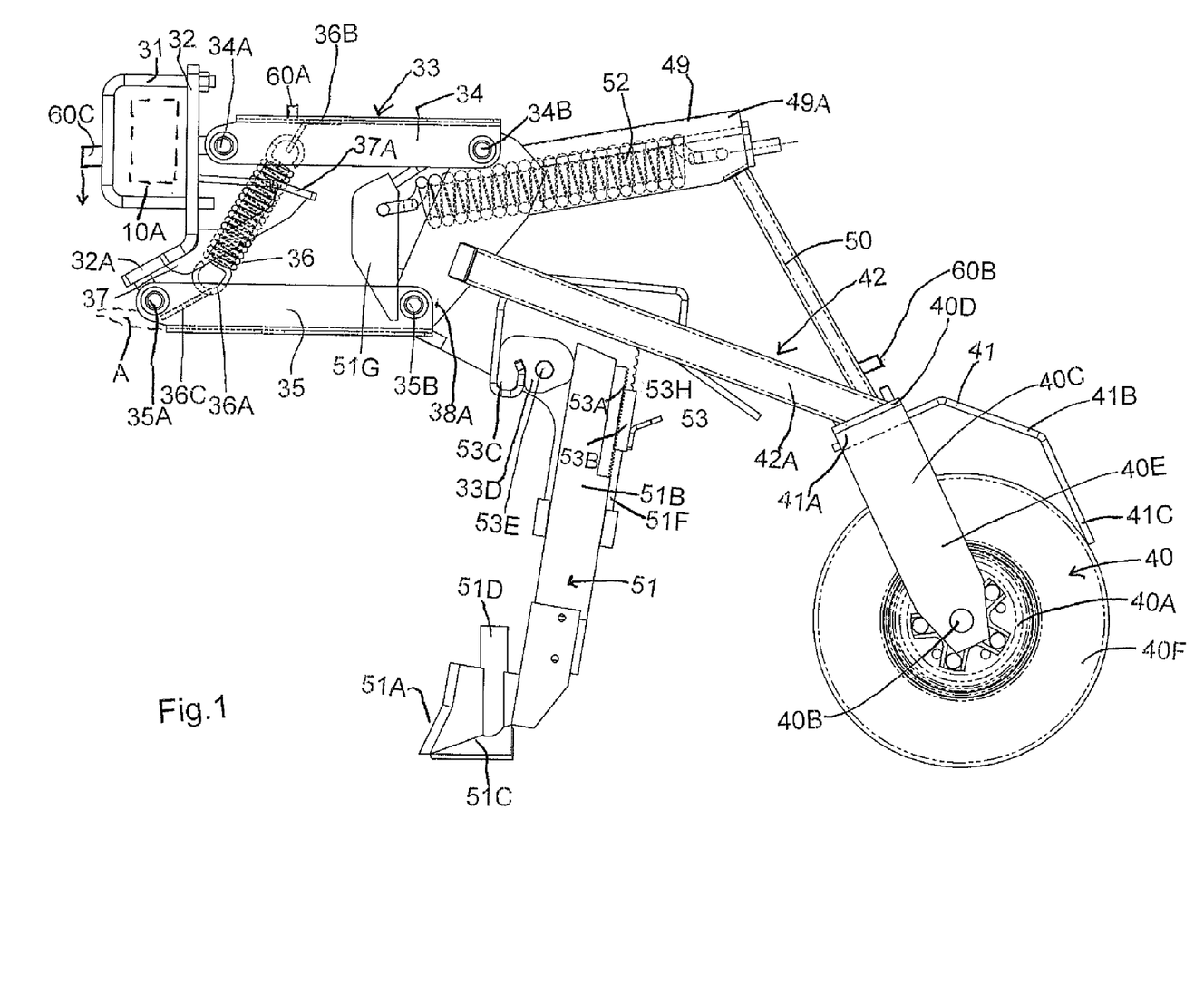
FIG. 1 is a side elevational view of one seeding element of a seeder according to the present invention.
Figure 2:
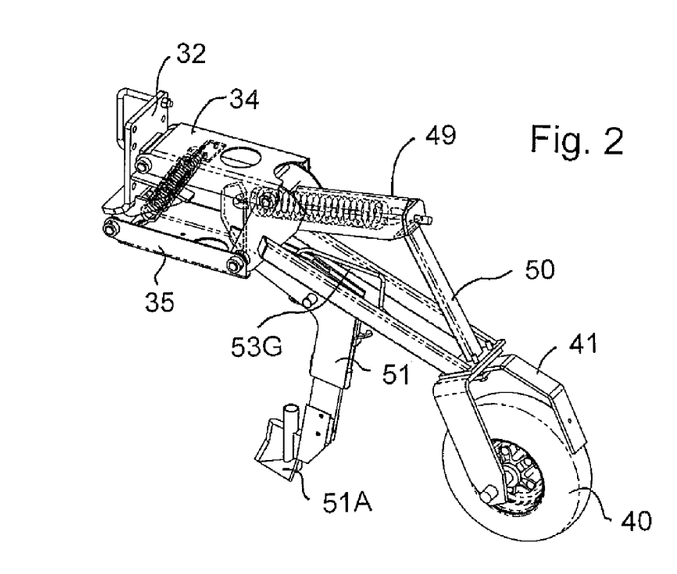
FIG. 2 is an isometric view from the rear and one side of the seeding element of FIG. 1.
Figures 3, 5:
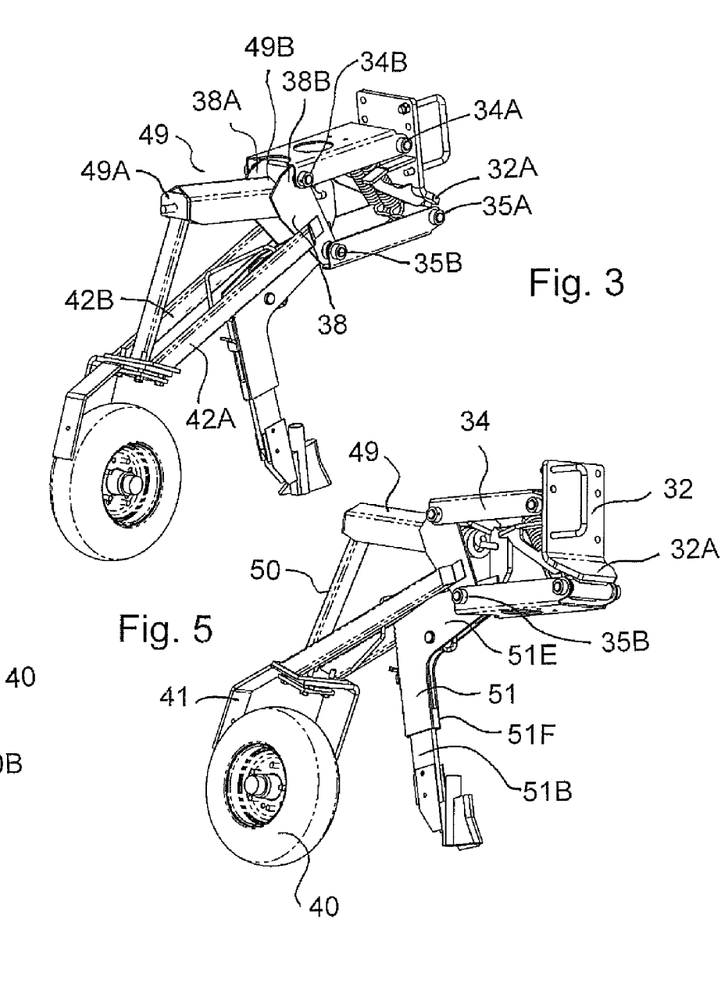
FIG. 3 is an isometric view from the rear and the other side of the seeding element of FIG. 1.
FIG. 5 is an isometric view from the front and one side of the seeding element of FIG. 1.
Figure 4:
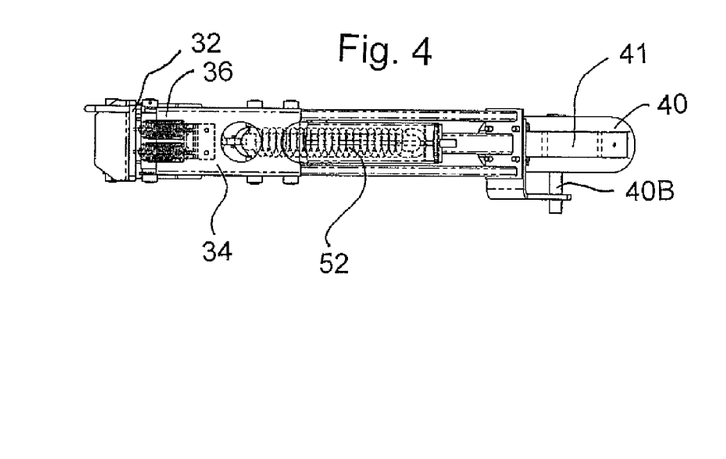
FIG. 4 is a top plan view of the seeding element of FIG. 1.

The sensor 60A for example as shown in FIG. 1 can be responsive to the angle of the parallel linkage relative to the tool bar.

In another arrangement, the control device is operated in response to a signal from a sensor 60C responsive to a height of the ground relative to the tool bar detected for example at the rocker shaft 15D.

In another arrangement, the height of the tool bar is controlled by the a sensor 60D responsive to pressure at the hydraulic cylinder 15B.

In another arrangement, the height of the tool bar is controlled by the a sensor 60E sensing the actual force applied by the ground on at least one of the packer wheels.

The invention claimed is:

1. An agricultural seeder comprising:
   a frame having at least one tool bar;
   ground wheels for supporting the frame for transportation in a direction of working movement across ground to be seeded;
   a plurality of seeding elements each including a bracket mounted on said at least one tool bar of the frame so that said plurality of seeding elements are arranged at spaced positions across the width of the frame for applying seeds to the ground as the frame is moved across the ground;
   each of said plurality of seeding elements including a ground opener for cutting a furrow into the surface of the ground;
   each of said plurality of seeding elements including a packer wheel behind the ground opener for rolling along the ground at or adjacent to the furrow;
   each of said plurality of seeding elements being mounted on said at least one tool bar for up and down floating movement relative to the frame independently of the other seeding elements;
   each of said plurality of seeding elements including a pair of parallel arms connected to the bracket and extending rearwardly therefrom to form a parallel linkage for said up and down floating pivotal movement relative to said at least one tool bar to different angles of the parallel linkage relative to the ground;
   each of said plurality of seeding elements including a rearwardly extending support arm connected at a rear end of the parallel arms and carrying the packer wheel such that the packer wheel can move upwardly and downwardly relative to said at least one tool bar;
   a spring arrangement extending between a component connected to said at least one tool bar and said parallel linkage and applying a downward spring force on said parallel linkage relative to said at least one tool bar on the parallel linkage and arranged to flex to provide said floating movement of said parallel linkage relative to said at least one tool bar to apply a downward force on the packer wheel, the spring arrangement being arranged such that the spring force increases as the parallel arms pivot upwardly and decreases as the parallel arms pivot downwardly;
   and a control device arranged to raise and lower said at least one tool bar relative to the ground so as to change the angle of the parallel linkage relative to the ground so as to change the downward spring force generated by said spring arrangement.

2. The seeder according to claim 1 wherein the control device is operated in response to a signal from a sensor at a respective one of said plurality of seeding elements.

3. The seeder according to claim 1 wherein the control device is operated in response to a signal from a sensor sensing the force applied on at least one of the packer wheels.

4. The seeder according to claim 1 wherein the control device is operated in response to a signal from a sensor a respective one of said plurality of seeding elements sensing the angle of the parallel linkage relative to said at least one tool bar.

5. The seeder according to claim 1 wherein the control device is operated in response to a signal from a sensor at the seeding element sensing the position of the seeding element relative to the tool bar.

6. The seeder according to claim 1 wherein the control device is operated in response to a signal from a sensor sensing the position of the frame relative to the packer wheel.

7. The seeder according to claim 1 wherein the control device is operated in response to a signal from a sensor sensing the hydraulic pressure on the frame height control cylinder.

8. The seeder according to claim 1 wherein the frame is carried on front and rear castor wheels and wherein the height of said at least one tool bar is controlled by operating a cylinder on the frame to rotate a rocker shaft on the frame to drive through linkages the height of the front and rear castor wheels relative to the frame so that the frame is maintained horizontal as the frame is raised and lowered.

9. The seeder according to claim 1 wherein the ground opener is carried on an arm which is pivotal relative to the support arm carrying the packer wheel for a spring trip action of the ground opener.

10. The seeder according to claim 1 wherein the bracket carries a bottom stop member for engaging one of the parallel arms to halt downward movement thereof.

11. The seeder according to claim 1 wherein the parallel arms carry a link connected across rear pivot pins at the rear of the parallel arms which link is rigidly attached to the rearwardly extending support arm carrying the packer wheel.

12. The seeder according to claim 11 wherein the ground opener is carried on an arm which is pivotal relative to the link for a spring trip action of the ground opener.

13. The seeder according to claim 11 wherein the support arm is pivotal relative to the rear pivot pin of a bottom one of the parallel arms.

14. The seeder according to claim 11 wherein the link carries a support member for a rear end of a spring which is deformed by the spring trip and wherein the support arm of the ground opener includes at its forward end a lever which pulls a forward end of the spring in the spring trip action.

15. The seeder according to claim 14 wherein the support member for the rear end of the spring forms a part of a brace for the support arm of the packer wheel.

16. The seeder according to claim 1 wherein the packer wheel includes a scraper strap extending rearwardly and over the packer wheel so that a rear end of the strap engages a peripheral surface of the packer wheel.

17. The seeder according to claim 1 wherein the ground opener includes a shank carried in a sleeve and extending downwardly from the sleeve for supporting a cutter at a bottom end of the shank and wherein the shank is adjustable longitudinally of the sleeve.

18. The seeder according to claim 17 wherein the shank and the sleeve each include a saw tooth rack longitudinally thereof so that the racks are interengaged at longitudinally adjustable positions therealong and wherein there is provided a manually operable cam which is movable to a locked position in which the racks are forced into engagement and to a released position in which the racks are free for longitudinal adjustment.

19. The seeder according to claim 18 wherein the cam is operable by a spring handle which is latched into position in the locked position.

20. An agricultural seeder comprising:
a frame having at least one tool bar;
ground wheels for supporting the frame for transportation in a direction of working movement across ground to be seeded;
a plurality of seeding elements each including a bracket mounted on said at least one tool bar of the frame so that said plurality of seeding elements are arranged at spaced positions across the width of the frame for applying seeds to the ground as the frame is moved across the ground;
each of said plurality of seeding elements including a ground opener for cutting a furrow into the surface of the ground;
each of said plurality of seeding elements including a packer wheel behind the ground opener for rolling along the ground at or adjacent to the furrow;
each of said plurality of seeding elements being mounted on said at least one tool bar for up and down floating movement relative to the frame independently of the other of said plurality of seeding elements;
wherein the ground opener includes a shank carried in a sleeve and extending downwardly from the sleeve for supporting a cutter at a bottom end of the shank where the shank is adjustable longitudinally of the sleeve; and
wherein the shank and the sleeve each include a respective saw tooth rack extending longitudinally of the sleeve and the shank so that the racks are interengaged at longitudinally adjustable positions therealong;
and wherein there is provided a manually operable cam which causes relative movement of the shank and the rack carried thereon relative to the sleeve and the rack carried thereon in a direction transverse to the sleeve and to the shank from a locked position in which the racks are forced into engagement to a released position in which the racks are free for longitudinal adjustment.

21. The seeder according to claim 20 wherein the cam is operable by a spring handle which is latched into position in the locked position.

* * * * *